No. 854,669.
PATENTED MAY 21, 1907.
M. D. REIDY.
TOOL HOLDER.
APPLICATION FILED JUNE 20, 1906.
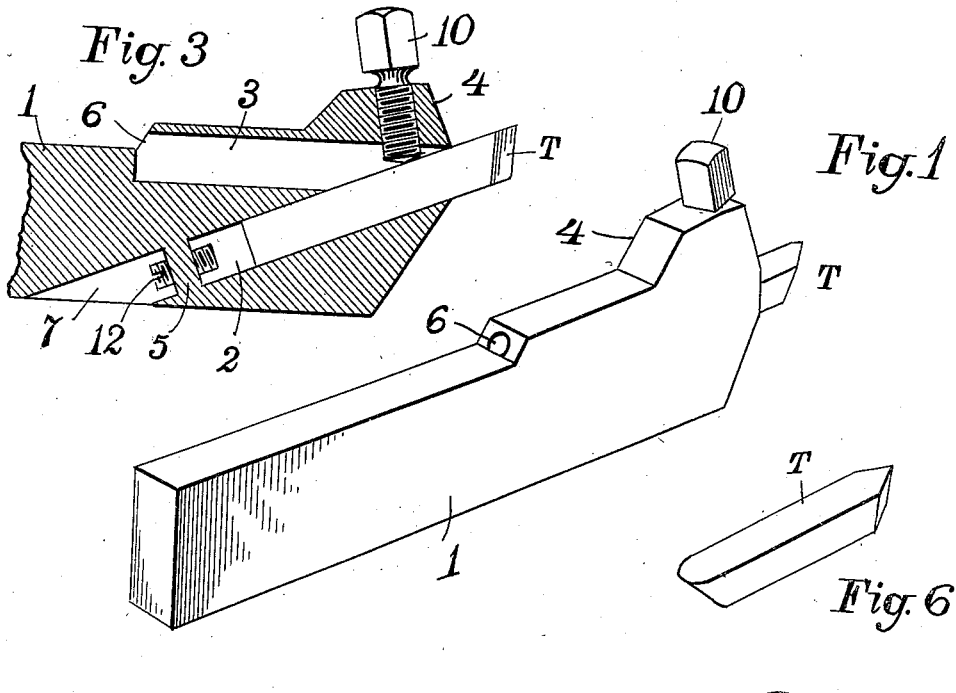
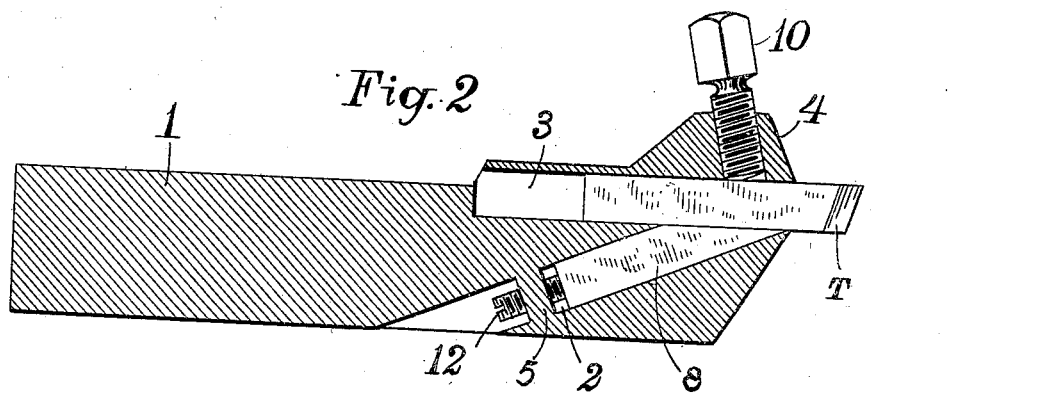
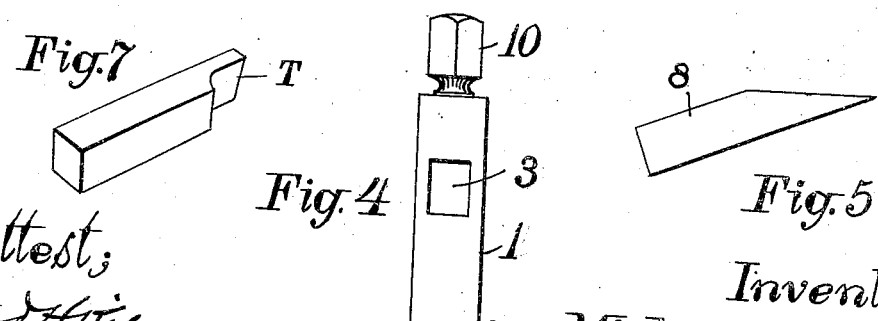
Inventor,
Michael D. Reidy,

UNITED STATES PATENT OFFICE.

MICHAEL D. REIDY, OF WORCESTER, MASSACHUSETTS.

TOOL-HOLDER.

No. 854,669.

Specification of Letters Patent.

Patented May 21, 1907.

Application filed June 20, 1906. Serial No. 322,599.

*To all whom it may concern:*

Be it known that I, MICHAEL D. REIDY, a citizen of the United States, and a resident of the city and county of Worcester, in the State of Massachusetts, have invented certain new and useful Improvements in Tool-Holders, of which the following is a full, clear, and exact description.

This invention relates to that type of tool holders for lathes and planers wherein a shank designed to be clamped in the tool post of the machine is adapted to receive small lengths of steel composing the cutting edges; and the object of this invention is the effecting of means for enabling the tool points to be held by such shank at either of two angles,—one horizontal, and the other in the neighborhood of twenty two degrees.

Referring to the drawings forming part of this specification, Figure 1 is a perspective view of a tool holder embodying my improvements. Fig. 2 is a vertical longitudinal section of the same showing the tool held horizontally thereby. Fig. 3 is a similar sectional view of the main part of the same showing the tool held at an acute angle. Fig. 4 is an end view of the tool holder. Fig. 5 is a detail view of device used in changing the tool holder to support a tool horizontally. Fig. 6 is a perspective view of one of the small tools used, and Fig. 7 is a perspective view of another such tool for turning square threads.

As shown, the tools are formed from lengths of tool steel rod about three eighths by a quarter of an inch in cross section; some being made with V-points for turning screw-threads of the usual type; some being square nosed for turning square threads; others given a diamond-point for turning steel; others round-nosed for turning cast iron, etc. By having these tool-points as the said parts T, are turned, as small as practicable in size but of the best of tool-steel, while the comparatively bulky tool holder 1 may be made from less expensive material, much economy is thereby had. As previously manufactured, however, the tool holders were made with a single slanting opening 2 for the reception of the tool-point so that the latter was held by the same at a wrong angle for many kinds of work.

To adapt the holder for supporting the tool points in a horizontal position, while at the same time it may be used for tools held at an angle, I form a horizontal opening 3 in addition to the angular one, each having practically the same mouth, as shown in Figs. 2 and 3. For retaining the tool points in place in either said openings, I tap the set screw 10 down through the shoulder 4 in a direction at right angles to a line bisecting the angle included between the two openings. This causes the set screw to make equal angles with the tool whether the latter is inserted in one opening or the other, as shown in Figs. 2 and 3.

In case the tool point is somewhat short, and fails to reach across the gap in the floor of the horizontal opening 3, I provide a removable bar 8 for insertion in the opening 2, having its upper end cut at an acute angle to constitute a surface continuous with said floor. This bar or block being inserted, the tool holder becomes practically as though adapted for the horizontal positioning of a tool point exclusively. By having a small set screw 12 tapped through the partition 5 which separates the opening 2 from an external recess 7 substantially in line therewith, the block 8 is adjusted to exactly the true position to adapt it for the designed purpose.

Inasmuch as bits of metal occasionally become clogged in the space about a tool point, and so wedge it in place as to prevent its withdrawal, I form the opening 3 with a hole 6 at its rear end, through which a wire or suitable device can be introduced for forcing the tool point out. The said hole also enables any dirt or shavings to be blown out from the opening preparatory to the insertion of a tool point.

In the manufacture of these tool holders I prefer to cast the same from semi-steel, with the various cavities therein suitably cored. This method I find to be fully enough accurate, and at the same time permits me to produce the holder at the minimum of expense.

In using the tool holder, the block 8 is placed in either opening 2 or 3 which is not to be put into service. When placed in the opening or pocket 2, said block is of course employed as an auxiliary support to the tool-point T; but it is put in the pocket 3 only for the purpose of preventing its being mislaid or lost. I also find that the block and set screw 12 serve another important purpose,— that of more securely and rigidly fastening the tool-points in place. To do thus, the set screw 10 is partially withdrawn, and the screw 12 turned in until the block 8 has wedged the tool T firmly up against the upper surface of the cavity or pocket 3. The screw 10 may then be set down firmly against the tool, if it is wished to make it doubly rigid; but even without the screw 10, the tool will be held with great rigidity, since it is clamped between two flat surfaces extending to the very mouth of the cavity or pocket 3.

What I claim as my invention and for which I desire Letters Patent is as follows, to wit:—

1. In a tool holder, a shank formed with two pockets of equal cross-sectional areas so that each may receive the tool having their external mouths coincident, but one pocket forming an acute angle with the other, in combination with a set screw tapped into the shank or holder near said mouth.

2. In a tool holder, a shank formed with two pockets of equal cross-sectional areas so that each may receive the tool having their mouths coincident but one pocket forming an acute angle with the other, in combination with a set-screw tapped into the shank or holder at right angles to a plane bisecting the angle formed by said pockets.

3. The combination in a tool holder, of a shank formed with two pockets of equal cross-sectional areas so that each may receive the tool, said pockets making an acute angle with each other, a set screw tapped into the shank close above the juncture of said pockets, and a removable block located in the lower pocket with its upper end made flush with the floor of the upper pocket, in order that the pressure of said set screw upon a tool inserted in the upper pocket may be prevented by said block from curving such tool.

4. The combination in a tool holder, of a shank formed with two pockets of equal cross-sectional areas so that each may receive the tool, said pockets making an acute angle with each other, a set screw tapped into the shank close above the juncture of said pockets, a removable block located in the lower pocket with its upper end made flush with the floor of the upper pocket, and means for adjusting the longitudinal position of said block.

In testimony that I claim the foregoing invention, I have hereunto set my hand this 16th day of June, 1906.

MICHAEL D. REIDY.

Witnesses:
   FREDERIC I. BLAKE,
   ALICE M. BLAKE.